(12) United States Patent
Li et al.

(10) Patent No.: US 11,247,320 B2
(45) Date of Patent: Feb. 15, 2022

(54) SENSOR OF ELECTRIC NAIL GUN

(71) Applicant: Zhejiang Rongpeng Air Tools Co., Ltd., Zhejiang (CN)

(72) Inventors: Xiaorong Li, Zhejiang (CN); Xiaopeng Li, Zhejiang (CN); Zhonghua Jiang, Zhejiang (CN)

(73) Assignee: Zhejiang Rongpeng Air Tools Co., Ltd., Zhejiang (CN)

( * ) Notice: Subject to any disclaimer, the term of this patent is extended or adjusted under 35 U.S.C. 154(b) by 114 days.

(21) Appl. No.: 16/843,904

(22) Filed: Apr. 9, 2020

(65) Prior Publication Data
US 2021/0276170 A1 Sep. 9, 2021

(51) Int. Cl.
*B25C 1/06* (2006.01)
*G01V 8/10* (2006.01)
*B25C 1/04* (2006.01)

(52) U.S. Cl.
CPC ............... *B25C 1/06* (2013.01); *B25C 1/047* (2013.01); *G01V 8/10* (2013.01)

(58) Field of Classification Search
CPC ....... B25C 1/06; B25C 1/04–048; B25D 1/08; B01V 8/10; G01V 8/10
See application file for complete search history.

(56) References Cited

U.S. PATENT DOCUMENTS

| | | | |
|---|---|---|---|
| 2009/0194574 A1* | 8/2009 | Shima ...................... | B25C 5/15 227/136 |
| 2014/0263535 A1* | 9/2014 | Rajani ...................... | B25C 1/06 227/2 |
| 2015/0158160 A1* | 6/2015 | Kato ..................... | F15B 15/149 91/35 |
| 2015/0306753 A1* | 10/2015 | Po ............................ | B25C 1/06 227/109 |
| 2019/0018032 A1* | 1/2019 | Sakamoto ............ | G01N 35/026 |

* cited by examiner

*Primary Examiner* — Anna K Kinsaul
*Assistant Examiner* — Veronica Martin

(57) ABSTRACT

A sensor of electric nail guns, comprising a gun body; a handle; a trigger; a gun nozzle disposed in a lower end of the gun body; a striker matching the gun nozzle disposed in the gun body; a charger disposed on a rear side of gun nozzle; the charger having an assorted forcer; an assorted motor disposed in a middle of the gun body; a first cylinder matching the striker and disposed in the gun body; a first piston disposed in the first cylinder; and a second piston matching an upper end of the striker and disposed in the upper end of the gun body; wherein a front end of the charger includes a photoinduction mechanism; the sensor of electric nail guns can prevent air shot or wrong shot of electric nail guns effectively, so as to guarantee the service performance of electric nail guns.

2 Claims, 5 Drawing Sheets

SENSOR OF ELECTRIC NAIL GUN

BACKGROUND OF INVENTION

Field of the Invention

The present invention relates generally to a sensor, and more particularly to a sensor of an electric nail gun.

Description of Related Art

The electric nail gun is an electric device for nailing. The electric nail gun is powered by the motor. Once a conventional electric nail gun is actuated, the motor is always in running state, but in practical nailing process, air shot or wrong shot sometimes happens, when the nails in the charger of electric nail gun are all struck out, and the motor is still in running state. If the user has not been aware that the nails have been all struck out and continues to pull the trigger, the striker of electric nail gun still performs the striking action, resulting in an air shot. The air shot will damage the components and motor inside the electric nail gun, and the motor is always in running state, if the worker presses the trigger by accident after a nailing, the nail is struck out, resulting in a wrong shot. Each nailing shall be accurate, once a wrong nailing happens, the nail shall be removed or later processing is required, that is very troublesome.

SUMMARY OF THE INVENTION

The technical problem to be solved in the present invention is to provide a sensor of electric nail guns, which can prevent air shot or wrong shot of electric nail guns effectively, so as to guarantee the service performance of electric nail guns.

In order to solve the above problems, the present invention adopts the following technical solutions:

A sensor of electric nail guns, comprising a gun body; a handle disposed on a rear side of an upper end of the gun body; a trigger disposed on the handle; a gun nozzle disposed in a lower end of the gun body; a striker matching the gun nozzle disposed in the gun body; a charger disposed on a rear side of gun nozzle; the charger having an assorted forcer; an assorted motor disposed in a middle of the gun body; a first cylinder matching the striker and disposed in the gun body; a first piston disposed in the first cylinder; and a second piston matching an upper end of the striker and disposed in the upper end of the gun body; wherein a front end of the charger includes a photoinduction mechanism; a circuit controller connected to the motor is disposed in the gun body; the circuit controller is connected to the photoinduction mechanism; a motor shaft of the motor is connected to an eccentric shaft mechanism; the eccentric shaft mechanism includes a connecting arm connected to the motor shaft of the motor and an eccentric shaft disposed on one end of the connecting arm; the eccentric shaft is connected to a first piston through a connecting rod; one end of the eccentric shaft has an embedding groove; the embedding groove includes an assorted eccentric shaft cylinder magnet; a first Hall induction mechanism corresponding to a position of the eccentric shaft cylinder magnet is disposed in the gun body; a piston cylinder magnet is embedded in one end of the second piston; a second Hall induction mechanism corresponding to the position of the piston cylinder magnet is disposed in the upper end of the gun body; the first Hall induction mechanism is connected to the circuit controller.

More particularly, wherein a lighting column is provided on the inner upper end of the photoinduction mechanism; a receiving lighting column opposite to the lighting column is disposed on the lower end inside the photoinduction mechanism; an inner box corresponding to the position of forcer is disposed between the lighting column and receiving lighting column; a lightproof slideway is disposed in the middle of the inner box; an upper through light hole corresponding to the position of lighting column and a lower through light hole corresponding to the position of receiving lighting column are disposed on both sides of the inner box respectively; the upper through light hole and lower through light hole are connected to the lightproof slideway.

More particularly, the sensor of electric nail guns defined in claim 1, wherein the back end of the handle includes a battery box and an assorted battery is disposed in the battery box.

Beneficial effects of the present invention:

In comparison to the existing technology, the sensor of electric nail guns of this structure can give a command to the circuit controller at the first moment through the photoinduction mechanism when the nails are all struck out, so that the circuit controller switches off the motor at the first moment, to effectively avoid the electric nail gun performing nailing action without nails, and to prevent air shot effectively. Moreover, during normal nailing, once the electric nail gun finishes a nailing action, the first Hall induction mechanism sends a signal to the circuit controller at the first moment, so that the circuit controller switches off the motor, each nailing only completes one nailing cycle, only one nail can be struck out, to effectively avoid the condition that the nailing quality cannot be guaranteed if the nailing action is too continuous, the worker can be fully prepared for completing the nailing action accurately, so as to guarantee the nailing quality. When the striker has struck out a nail and been reset, the second Hall induction mechanism sends a signal to the circuit controller, so that the circuit controller switches on the motor, another nailing action is implemented, the nailing work can be performed steadily.

DETAILED DESCRIPTION OF THE INVENTION

Figure 1:
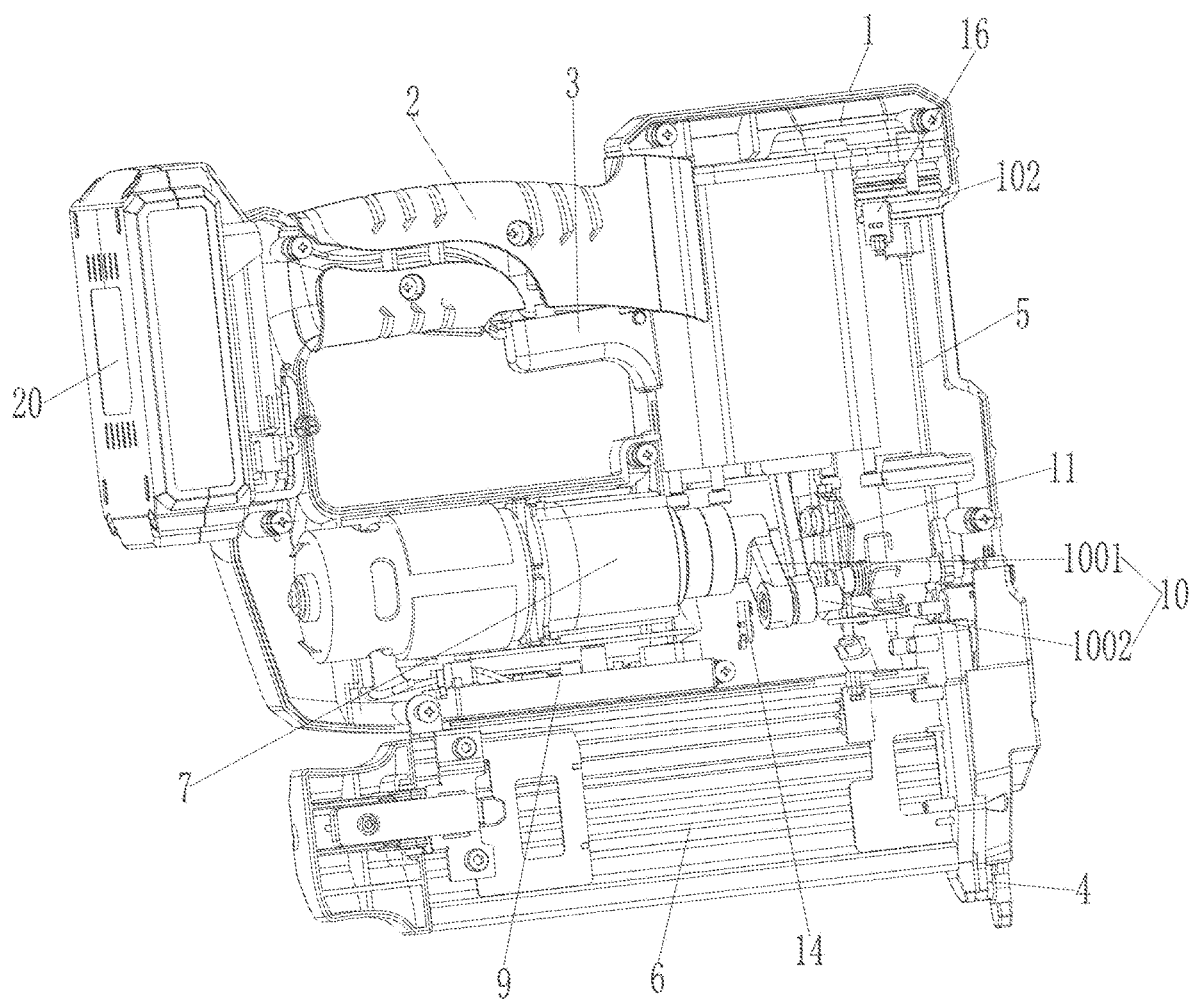
FIG. 1 is a structural representation from an angle of the sensor of electric nail gun of the present invention.
Figure 2:
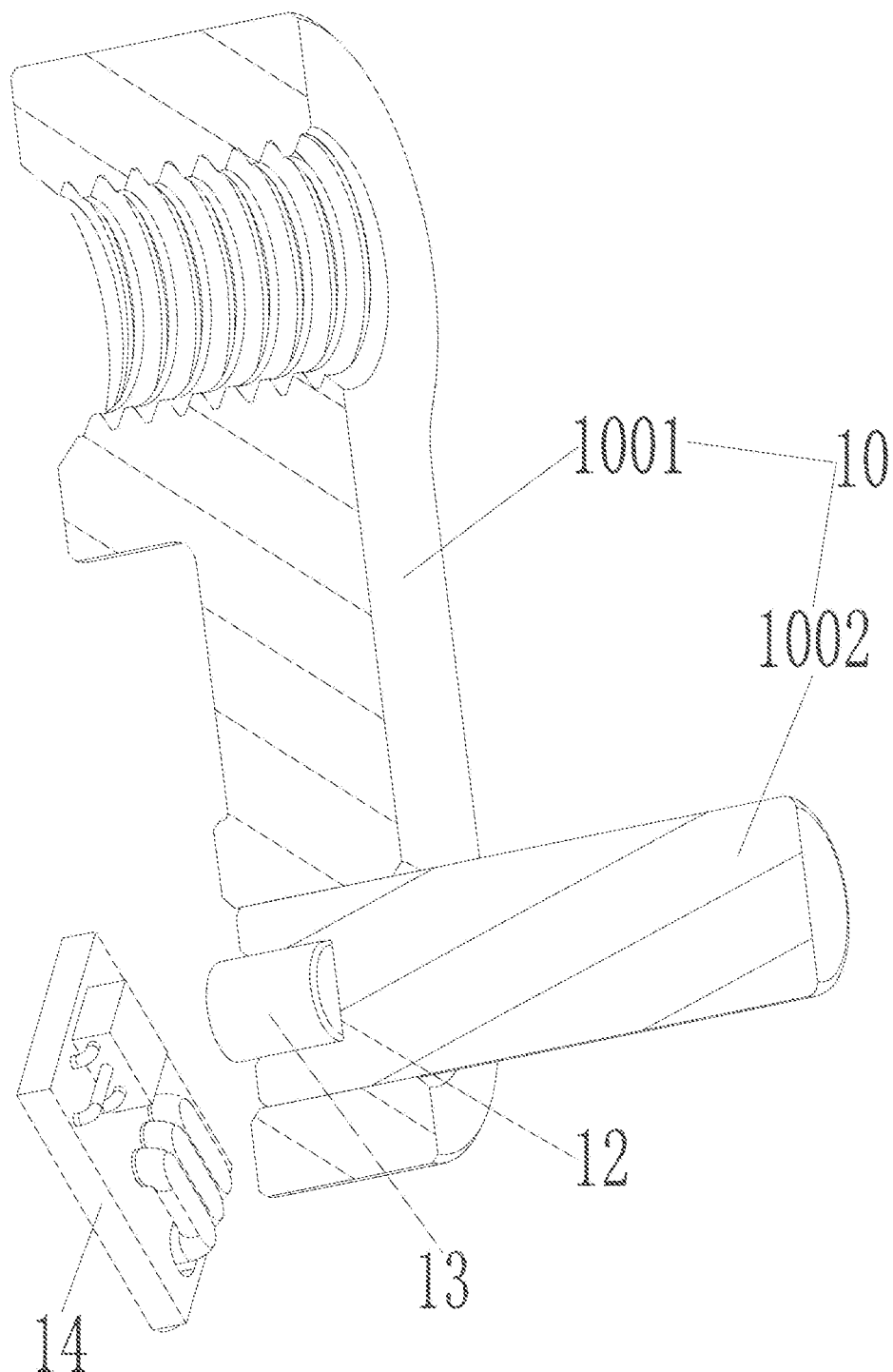
FIG. 2 is a structural representation of eccentric shaft mechanism.
Figure 3:
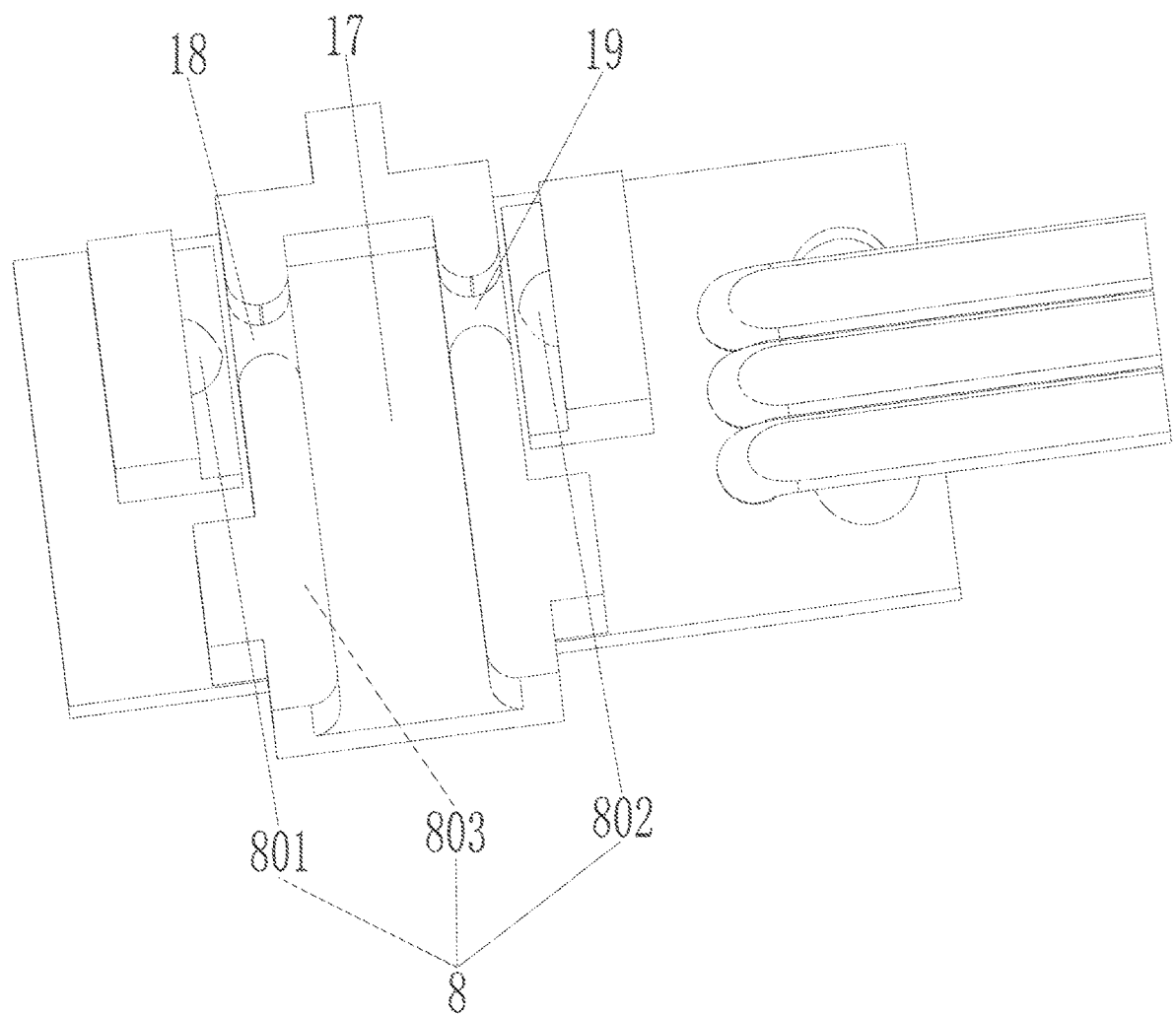
FIG. 3 is a structural representation of photoinduction mechanism.
Figure 4:
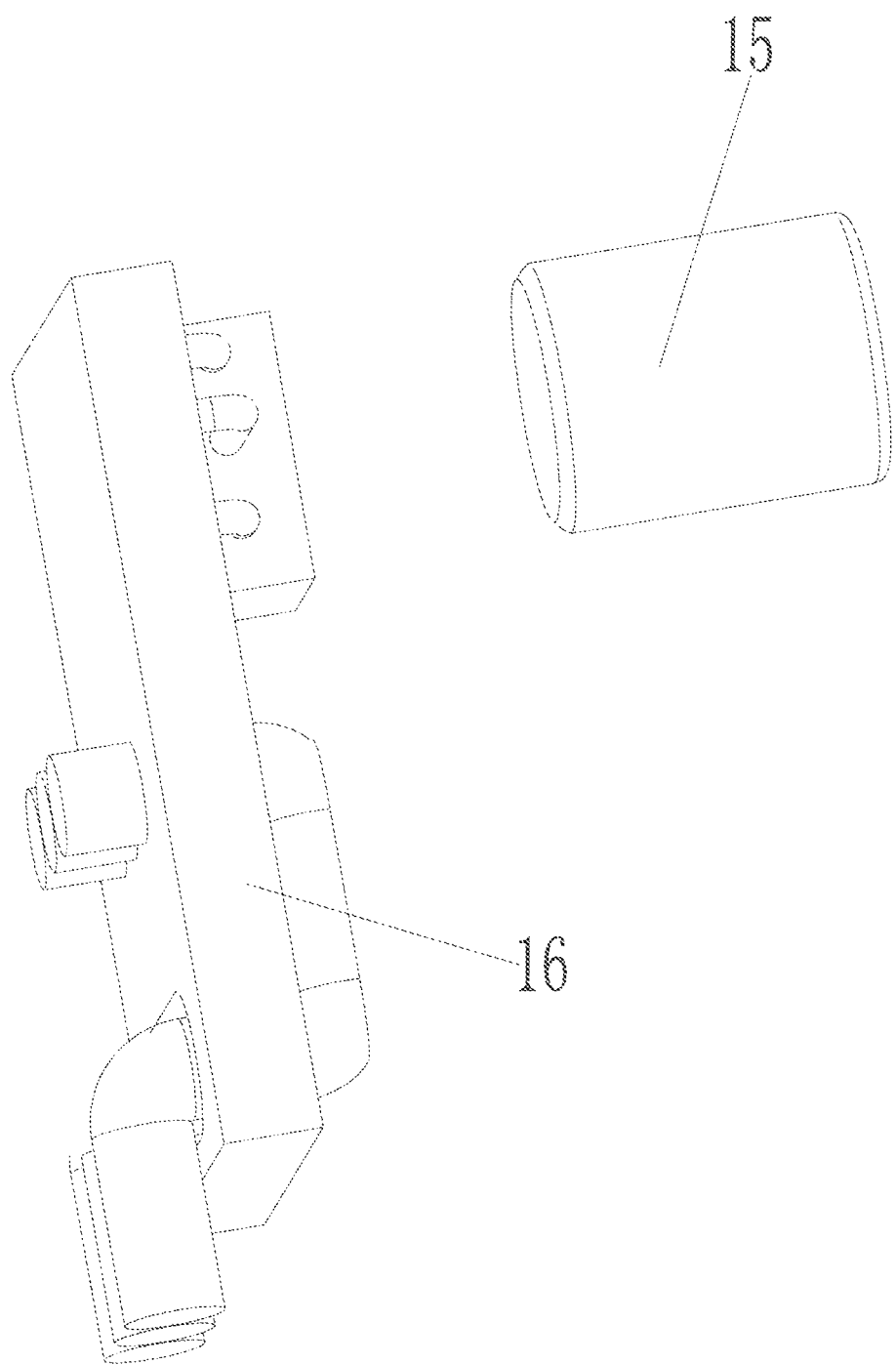
FIG. 4 is a structural representation of the second Hall induction mechanism.
Figure 5:
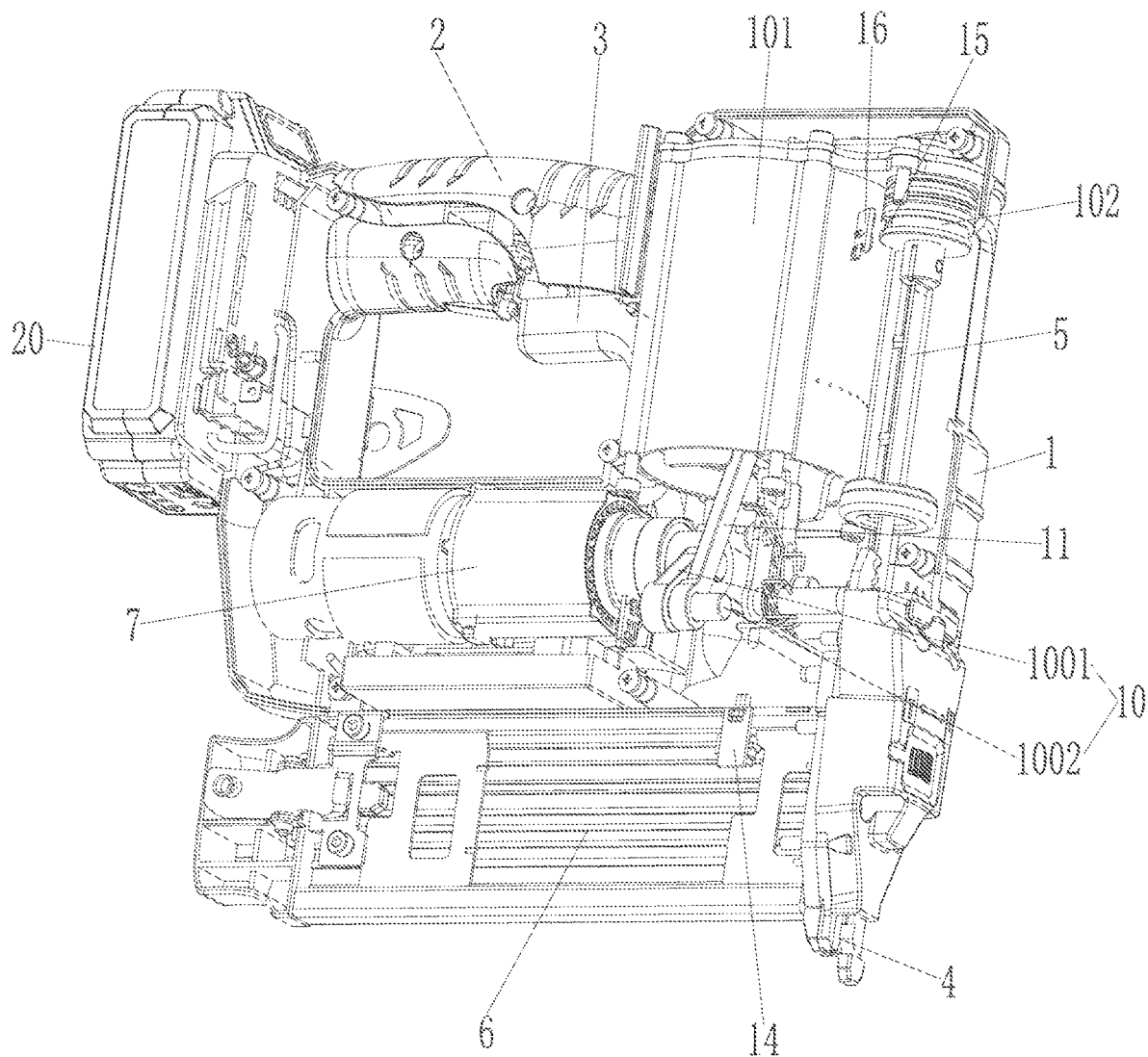
FIG. 5 is a structural representation from another angle of the sensor of electric nail gun of the present invention.

The detailed description is given below according to the attached figures:

As shown in FIG. 1 to FIG. 5, the present invention provides a sensor of electric nail guns, including a gun body 1, a handle 2 disposed on the rear side of upper end of gun body 1 and a trigger 3 on handle 2. A gun nozzle 4 is located at the lower end of gun body 1. A striker 5 matching the gun nozzle 4 is located in gun body 1. A charger 6 is located on the rear side of gun nozzle 4. The charger 6 is provided with an assorted forcer. An assorted motor 7 is disposed in the middle of gun body 1. A first cylinder 101 matching the striker 5 is disposed in gun body 1. A first piston is disposed in the first cylinder 101. A second piston 102 matching the upper end of striker 5 is disposed in the upper end of gun body 1. A photoinduction mechanism 8 is disposed on the front end of the charger 6. A circuit controller 9 connected to motor 7 is disposed in the gun body 1. The circuit controller 9 is connected to photoinduction mechanism 8. The motor shaft of the motor 7 is connected to an eccentric shaft mechanism 10. The eccentric shaft mechanism 10 comprises a connecting arm 1001 connected to the motor shaft of motor 7 and an eccentric shaft 1002 disposed on one end of connecting arm 1001. The eccentric shaft 1002 is connected to the first piston through a connecting rod 11. One end of the eccentric shaft 1002 is provided with an embedding groove 12. An assorted eccentric shaft cylinder magnet 13 is disposed in the embedding groove 12. A first Hall induction mechanism 14 corresponding to the position of eccentric shaft cylinder magnet 13 is located in the gun body 1. A piston cylinder magnet 15 is embedded in one side of the second piston 102. A second Hall induction mechanism 16 corresponding to the position of piston cylinder magnet 15 is disposed in the upper end of the gun body 1. The first Hall induction mechanism 14 is connected to circuit controller 9.

A lighting column 801 is disposed on the upper end inside the photoinduction mechanism 8. A receiving lighting column 802 opposite to the lighting column 801 is disposed on the lower end inside the photoinduction mechanism 8. An inner box 803 corresponding to the position of forcer is located between the lighting column 801 and receiving lighting column 802. A lightproof slideway 17 is disposed in the middle of the inner box 803. An upper through light hole 18 corresponding to the position of lighting column 801 and a lower through light hole 19 corresponding to the position of receiving lighting column 802 are disposed on both sides of the inner box 803 respectively. The upper through light hole 18 and lower through light hole 19 are connected to the lightproof slideway 17.

A battery box 20 is disposed in the back end of the handle 2. An assorted battery is disposed in the battery box 20.

The usage of the present invention is described below:

When the electric nail gun is in normal operation, as long as the trigger 3 is pulled, the striker 5 hits out and contacts the nail, pushing the nail out of the gun nozzle 4 to finish the nailing action. Therefore, a nailing is completed once the trigger 3 is pulled, meaning a nail is struck out. When the struck nail penetrates into the wood surface, the striker 5 returns to the original position, the strike of striker 5 depends on the first piston of the first cylinder 101 which pushes forward to compress the air in the first cylinder 101 to generate high pressure to push the striker 5 to perform nailing. The withdrawal of striker 5 is implemented by the first piston of the first cylinder 101 which moves back to form vacuum inside the first cylinder 101, so that the striker 5 is restored. The first piston is driven by the connecting rod 11. The connecting rod 11 is driven by the eccentric shaft 1002 of eccentric shaft mechanism 10. When the motor 7 is in operation, the motor shaft of motor 7 drives the connecting arm 1001 of eccentric shaft mechanism 10 to rotate, driving the eccentric shaft 1002 to rotate, the motion of the first piston is implemented. When the striker 5 returns to the original position, the eccentric shaft 1002 exactly drives the eccentric shaft cylinder magnet 13 to exactly rotate to the position of the first Hall induction mechanism 14, the first Hall induction mechanism 14 senses the signal from the eccentric shaft cylinder magnet 13, the signal is transmitted to the circuit controller 9 at the first moment, and the circuit controller 9 stops the rotation of motor 7 immediately, so that the motor 7 is switched off. Therefore, after a nail is struck out, the motor 7 stops running immediately, even if the worker presses the trigger 3 by accident at this moment, none of nails will be struck out, so as to avoid wrong shot when the worker is not ready influencing the nailing quality.

When the striker 5 has returned, the second piston is reset, and the piston cylinder magnet 15 of the second piston is reset accordingly, moving to the position opposite to the second Hall induction mechanism 16, the second Hall induction mechanism 16 senses the magnetism of piston cylinder magnet 15. When the second Hall induction mechanism 16 senses the magnetism, it sends a command to the circuit controller 9 immediately, so that the circuit controller 9 actuates the motor 7 at the first moment. When the motor 7 is actuated, the worker can implement nailing action by pulling the trigger 3. When a nailing is finished, the motor 7 is switched off again under the effect of the first Hall induction mechanism 14, cycles are implemented this way. When the striker 5 has not returned to the original position, the second piston 102 has not returned, too. The second Hall induction mechanism 16 cannot induce the magnetism of piston cylinder magnet 15, the motor 7 is still off, so that each nailing will not be performed until the worker is fully prepared, the nailing quality is guaranteed effectively, and wrong shot is prevented.

In practical nailing process, once a nail is struck out, the forcer on the charger 6 gets a little close to the front end of charger 6 under the effect of spring. When all the nails in the charger 6 are struck out of the gun nozzle 4, the forcer is completely close to the photoinduction mechanism 8, and a portion of forcer is inserted in the lightproof slideway 17 directly, separating the upper through light hole 18 from the lower through light hole 19 directly. The light emitted from the lighting column 801 cannot be received by the receiving lighting column 802 through the upper through light hole 18, lightproof slideway 17 and lower through light hole 19. Before the nails in the charger 6 are all struck out, the light emitted from the lighting column 801 always can be received by the receiving lighting column 802. Once the light from the lighting column 801 is shielded, the receiving lighting column cannot receive light, the photoinduction mechanism 8 sends a signal to the circuit controller 9 at the first moment, so that the circuit controller 9 switches off the motor immediately. When the motor 7 is switched off, no matter how the worker pulls trigger 3, the electric nail gun will not strike nails out, so as to prevent air shot effectively.

To sum up, the present invention allows the photoinduction mechanism 8 to send a command to the circuit controller 9 at the first moment when the nails are all struck out, so that the circuit controller 9 switches off motor 7 at the first moment, effectively preventing the electric nail gun from nailing without nails, and effectively preventing air shot. Moreover, during normal nailing, once the electric nail gun finishes a nailing action, the first Hall induction mechanism 14 sends a signal to the circuit controller 9 at the first moment, so that the circuit controller 9 switches off motor 7, each nailing only completes one nailing cycle, only one nail can be struck out, effectively preventing the situation that the nailing quality cannot be guaranteed if the nailing action is too continuous, the worker can complete nailing action accurately upon sufficient preparation, the nailing quality is guaranteed. When the striker 5 strikes out a nail and returns to the original position, the second Hall induction mechanism 16 sends a signal to the circuit controller 9, the circuit controller switches on the motor 7, another nailing action is implemented, so that the nailing work can be performed stably.

A battery box 20 is disposed in the back end of handle 2. An assorted battery is disposed in the battery box 20. The battery supplies power to the motor stably, the motor 7 is powered even without wiring, the moving range of electric nail gun will not be confined by the wire.

We claim:

1. A sensor system of electric nail guns, comprising
a gun body;
a handle disposed on a rear side of an upper end of the gun body;
a trigger disposed on the handle;
a gun nozzle disposed in a lower end of the gun body;
a striker matching the gun nozzle disposed in the gun body;
a charger disposed on a rear side of gun nozzle; the charger having an assorted forcer;
an assorted motor disposed in a middle of the gun body;
a first cylinder disposed in the gun body;
a first piston disposed in the first cylinder; and
a second piston matching an upper end of the striker and disposed in the upper end of the gun body; wherein
a front end of the charger includes a photoinduction mechanism;
a circuit controller connected to the motor is disposed in the gun body;
the circuit controller is connected to the photoinduction mechanism;
a motor shaft of the motor is connected to an eccentric shaft mechanism;
the eccentric shaft mechanism includes a connecting arm connected to the motor shaft of the motor and an eccentric shaft disposed on one end of the connecting arm; the eccentric shaft is connected to the first piston through a connecting rod;
one end of the eccentric shaft has an embedding groove; the embedding groove includes an assorted eccentric shaft cylinder magnet;
a first Hall induction mechanism corresponding to a position of the eccentric shaft cylinder magnet is disposed in the gun body;
a piston cylinder magnet is embedded in one end of the second piston;
a second Hall induction mechanism corresponding to the position of the piston cylinder magnet is disposed in the upper end of the gun body; the first Hall induction mechanism is connected to the circuit controller
wherein a lighting column is provided on the inner upper end of the photoinduction mechanism;
a receiving lighting column opposite to the lighting column is disposed on the lower end inside the photoinduction mechanism;
an inner box corresponding to the position of forcer is disposed between the lighting column and receiving lighting column;
a lightproof slideway is disposed in the middle of the inner box;
an upper through light hole corresponding to the position of lighting column and a lower through light hole corresponding to the position of receiving lighting column are disposed on both sides of the inner box respectively;
the upper through light hole and lower through light hole are connected to the lightproof slideway.

2. The sensor of electric nail guns defined in claim 1, wherein the back end of the handle includes
a battery box and
an assorted battery is disposed in the battery box.

* * * * *